United States Patent Office 3,488,414
Patented Jan. 6, 1970

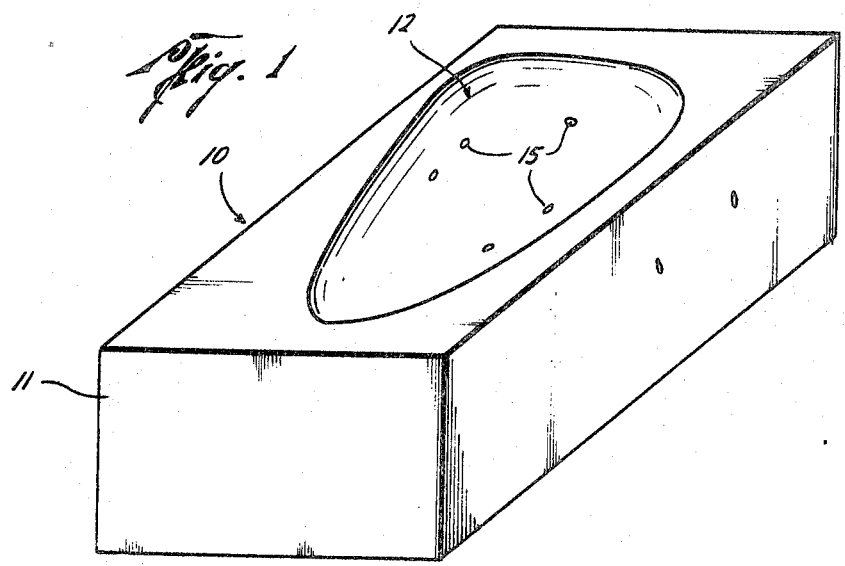
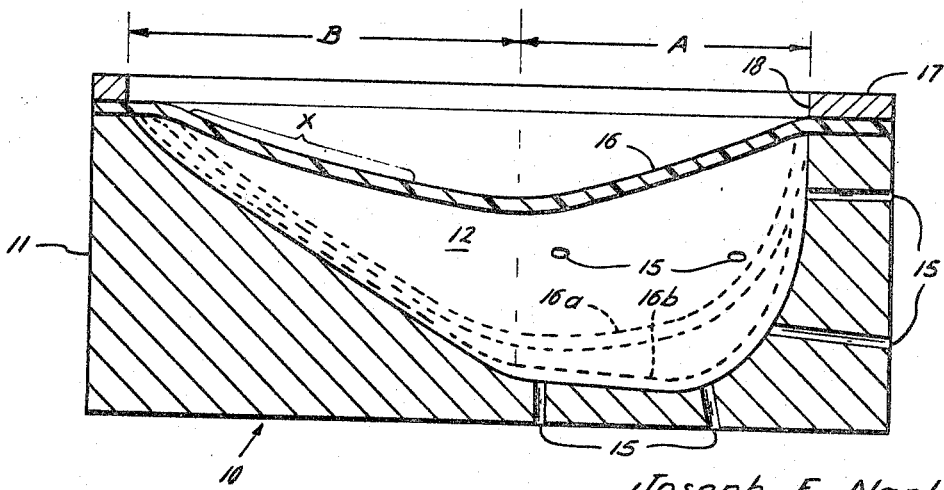

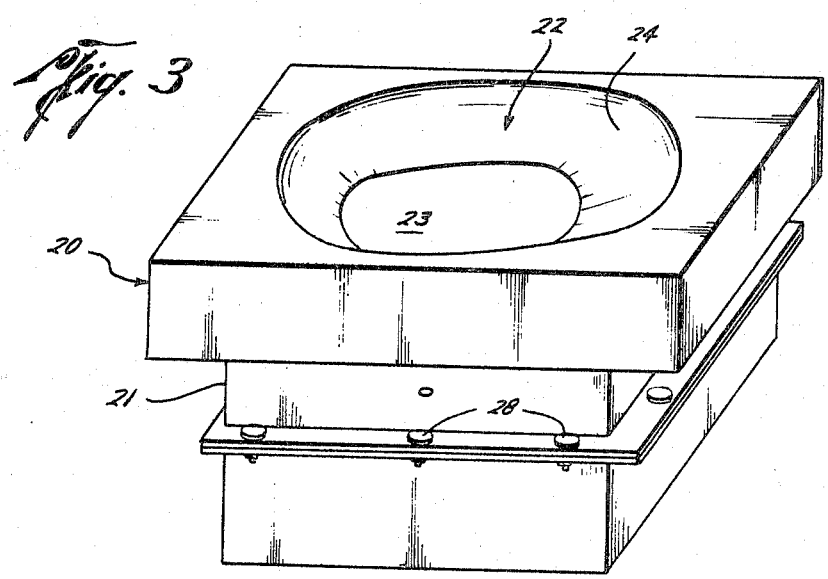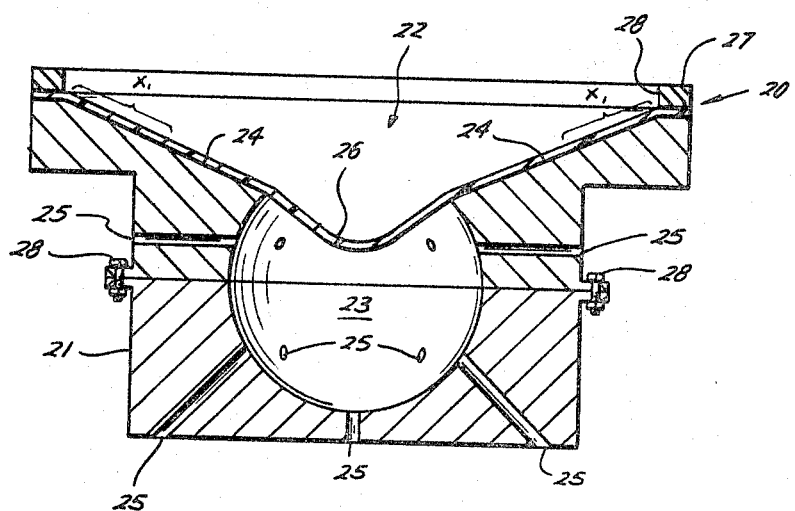

3,488,414
METHOD FOR FORMING PLASTIC MATERIALS
Joseph F. Naples, Houston, Tex., assignor to the United States of America as represented by the Administrator of the National Aeronautics and Space Administration
Filed July 6, 1966, Ser. No. 563,648
Int. Cl. B29c 17/04
U.S. Cl. 264—92     3 Claims

ABSTRACT OF THE DISCLOSURE

A method for deep drawing plastic products wherein uniform thickness of the finished article is required. The plastic sheet is heated until pliable, and then placed over the open cavity of a mold having a forming area and an excess trough area. The portion of the sheet overlying the excess trough area is then subjected to additional heat until the material in that area stretches out and almost touches the bottom of the cavity. Vacuum is then applied to the forming area and the sheet is caused to conform to the mold. The thickness of the plastic in the forming area remains constant, while any thin out occurs in the plastic lying in the excess trough area which will be trimmed off.

---

The invention described herein was made by an employee of the United States Government and may be manufactured and used by or for the Government for governmental purposes without the payment of any royalties thereon or therefor.

This invention relates to improvements in processes for forming articles from plastic sheet material, and more particularly relates to processes and apparatus for forming articles from plastic sheet material wherein the thickness of the finished article will be substantially uniform throughout and will be substantially the same thickness as that of the original sheet material.

One of the best known methods for forming articles out of plastic sheet material involves "deep-draw" molding techniques wherein the sheet material is first heated and then drawn by means of a vacuum, or the like, into a mold cavity having the desired configuration of the article. However, heretofore the sheet material used in such deep-draw processes has had a tendency to thin out in the deeper portions of the mold cavity in that the material normally stretches as it is drawn into the mold. Needless to say, this thinning of material has created severe problems in those instances where the minimum thickness of the desired article is critical, e.g., safety visors for space helmets and the like.

Previous efforts to solve this thinning problem has involved using sheet material which has an original thickness greater than that desired in the formed article. It was thought that by using this thicker material any stretching of the material during molding would be compensated for by the increased thickness of the material, and that a minimum thickness of the formed article would be assured. However, it was found that the amount of thinning was not constant in every molding operation, and that the stretching of the material occurred at different places in the mold from run to run, even when sheets of the same material were formd in the same mold. As many as six articles had to be molded using this procedure in order to obtain one article which was acceptable. Such a procedure is expensive, time consuming, and is extremely unreliable.

The present invention provides an improvement in standard deep-draw molding processes wherein the reliability of the process is increased and wherein the thickness of the formed article is substantially uniform throughout. It involves adding an excess trough area to a mold so that it forms an integral part thereof and uses a sheet of material whose area, rather than its thickness, is larger than that of the finished article. The entire sheet is first heated to a temperature where the material becomes pliable. Next the sheet is positioned over the mold so that it covers both the cavity in which the article is to be formed and the integral excess trough area. With the sheet secured in this position, concentrated heat is applied only to a portion of that area of the sheet which overlies the trough. When this heated portion of the material reaches the point where it attains a pasty, relatively liquid consistency, the sheet will sag downward toward the bottom of the mold and trough. At this point a vacuum is applied in the mold through ports which are positioned in that area of mold in which the article is to be shaped. This vacuum will pull the sheet material downward until it touches the bottom of the mold, thereby forming a seal therewith which in turn allows the vacuum to pull the still pliable section of the sheet into the forming area to shape the desired article. After it is allowed to cool the plastic material is removed from the mold and the excess material is trimmed away. For the sake of economy, this excess material can later be reformed into sheets for future use. This procedure restricts substantially all of the stretching of the material to the excess area, with the result being an article which has a uniform, predictable thickness throughout. This invention can be used in a variety of different shaped molds to form a plurality of differently shaped articles, as will be more fully explained below.

The actual mold construction, method operation, and the apparent advantages of the invention will be better understood by referring to the drawings in which like numerals identify like parts in the different figures and in which:

FIG. 1 is a perspective view of a mold made in accordance with the present invention;

FIG. 2 is a longitudinal, cross-sectional view of the mold of FIG. 1 with a sheet of plastic material in place on the mold;

FIG. 3 is a perspective view of a modified form of a mold made in accordance with the present invention; and FIG. 4 is a longitudinal, cross-sectional view of the mold of FIG. 3 with a sheet of plastic material in place on the mold.

Referring more particularly to the drawings, FIGS. 1 and 2 show a mold 10 having a body 11 in which a molding cavity 12 is provided. As is well known in the molding art, body 11 can be made of any material, e.g., plaster, wood, metal, etc., normally used in making plastic sheet forming molds of this general type. Cavity 12, although being a single, continuous cavity, is comprised of two distinct areas. A first or forming area, designated as A in FIG. 2, is that portion of cavity 12 in which the desired article is actually formed. Contiguous with forming area A is a second or excess trough area B, the purpose of which will be set forth below.

A plurality of ports 15 are positioned in body 11 so that all of said ports open into forming area A of cavity 12. The exact location of these ports will depend on the actual configuration of the desired article, but it is noted that all of these ports are positioned within forming area A. A manifold of rubber tubing, or the like (not shown), can be used to connect all of ports 15 to a vacuum source (not shown), as is well known in the art.

To illustrate the steps followed in carrying out the present invention, an example is set forth below in which a ⅛ inch thick sheet of Plexiglas is used to form a visor for a helmet, or the like. It should be realized that the present invention lends itself to the molding of almost all plastic sheet materials, and that the temperatures set out below would vary slightly, depending on the material used. First, mold 10 is heated in an oven or by other means to a temperature between 150° F.–200° F. Where a large number of articles are to be mass produced, the mold 10 could be constructed so as to include heating coils (not shown) whereby the mold could be maintained at the desired temperature for long periods of time.

After mold 10 attains the desired temperature, a sheet 16 of Plexiglas is heated in an oven or by other means to a temperature of 250° F.–300° F. At this temperature the material is soft and pliable, but still has a relatively solid consistency. The heated sheet is positioned on mold 10 and is held in place by cover plate 17. This plate which is made of wood, or like material, has an opening 18 therethrough, the perimeter of which corresponds to the perimeter of cavity 12, so that when plate 17 is in place the entire portion of sheet 16, which overlies cavity 12, will be exposed. At this point sheet 16 will slightly sag into cavity 12 due to its pliable consistency (see FIG. 2).

With plate 17 in place, additional heat is concentrated on a portion of sheet 16, which is designated as X in FIG. 2, until that portion achieves a relatively liquid consistency. Ordinary heat guns or infrared lamps can be used for applying this additional heat. When area X of sheet 16 reaches this relative liquid consistency, the weight of sheet 16 will tend to stretch the material in portion X, such that sheet 16 further sags into cavity 12 to a point where the material in portion X almost touches excess trough area B and the portion of sheet 16 to be formed in forming area A is disposed immediately adjacent to the forming area, this position being shown as dotted lines 16a. This stretch will occur in space prior to touching the bottom of the mold.

At this point, just prior to the time the material in portion X would touch excess trough area B, a vacuum is applied to forming area A through ports 15 which draws sheet 16 downward to the bottom of cavity 12. When the material of portion X touches the bottom of the mold, a seal will be formed therewith which then allows the vacuum in forming area A to pull the pliable portion of sheet 16 into said area A to form the desired article. Sheet 16 at this point will be substantially in the position shown by dotted lines 16b. It will be noted that substantially all of the thinning in sheet 16 will be restricted to portion X of the sheet, and that the thickness of the article in forming area A will be uniform and substantially the same as the original thickness of the sheet.

When the sheet 16 cools it is removed from mold 10, and the material which was in the excess trough area B is trimmed away leaving a finished visor. The excess material can later be reformed into new sheets for future use.

A modified form of a mold made in accordance with the present invention is shown in FIGS. 3 and 4. Mold 20 has a body 21 of two or more pieces in which a molding cavity 22 is provided. Cavity 22 has a forming area 23 and an excess trough area 24 which are contiguous with each other, as clearly shown in FIG. 4. A plurality of ports 25 are provided in body 21 which open into forming area 23 and which can be attached to a vacuum source by a suitable manifold. A cover plate 27 having an opening 28 is used to hold a sheet 26 of plastic material in place (FIG. 4) on the mold.

The method of molding an article in mold 20 is similar to the method described above in conjunction with mold 10. Mold 20 is first heated, sheet 28 is preheated to a pliable consistency and positioned onto mold 20, concentrated heat is applied to a portion $X_1$ (FIG. 4) of sheet 28 which overlies excess trough 24 until the material in that portion reaches a relatively liquid consistency, and then a vacuum is applied to forming area 23 to draw sheet 28 into said area. Once again, substantially all of the thinning which occurs in sheet 28 will be in portion $X_1$ so that the article formed in forming area 23 will have a uniform thickness throughout. The material is allowed to cool and the excess material is trimmed away. Mold 20 is then disassembled by removing bolts 28 and the formed article is removed therefrom.

It should be understood that the foregoing disclosure relates to preferred embodiments of the invention and that it is intended to cover all changes and modifications therein which do not constitute a departure from the spirit and scope of the invention.

What is claimed and desired to be secured by Letters Patent is:

1. A process of forming an article of substantially uniform thickness throughout from a sheet of plastic material wherein the article is formed in a mold having an open cavity consisting of a forming area and an excess trough area contiguous with each other comprising:

heating the sheet of plastic material until said material becomes relatively soft and pliable;

positioning the heated, pliable sheet of material over the open cavity in the mold so that it completely covers both the forming area and the excess trough area;

applying additional heat to that portion of the sheet which overlies the excess trough area until the material in that portion reaches a pasty, relatively liquid consistency, and thins out to a point where it almost touches the excess trough area, and the portion of the sheet to be formed in the forming area is disposed immediately adjacent to said forming area;

applying a pressure differential to the forming area of the mold before any of the material which has been additionally heated comes into contact with the excess trough area, whereby the portion of the sheet overlying the forming area will be forced directly against said area to form the desired article with thinning of the sheet occurring only in that section forced against the excess trough area;

allowing the plastic material to cool; and trimming away the excess plastic material from the formed article.

2. A process of forming an article as set forth in claim 1, including the step of:

preheating the mold to a temperature slightly less than that of the heated, pliable sheet of material before said material is positioned on the mold.

3. A process of forming an article as set forth in claim 2 wherein said pressure differential consists of a vacuum in said forming area.

References Cited

UNITED STATES PATENTS

| | | | |
|---|---|---|---|
| 2,749,572 | 6/1956 | Nowak | 264—92 |
| 3,019,488 | 2/1962 | Doyle et al. | 264—92 |
| 3,123,863 | 3/1964 | Reilly et al. | 264—92 |

ROBERT F. WHITE, Primary Examiner

J. H. SILBAUGH, Assistant Examiner

U.S. Cl. X.R.

18—35; 264—138, 327